US012175389B2

(12) United States Patent
Kulkarni et al.

(10) Patent No.: US 12,175,389 B2
(45) Date of Patent: Dec. 24, 2024

(54) METHOD AND SYSTEM FOR PREDICTIVE MAINTENANCE OF HIGH PERFORMANCE SYSTEMS (HPC)

(71) Applicant: Tata Consultancy Services Limited, Mumbai (IN)

(72) Inventors: Rajesh Gopalrao Kulkarni, Pune (IN); Amit Kalele, Pune (IN); Anubhav Jain, Pune (IN); Sanjay Lalwani, Pune (IN); Pradeep Gameria, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 764 days.

(21) Appl. No.: 17/481,552

(22) Filed: Sep. 22, 2021

(65) Prior Publication Data

US 2023/0026064 A1    Jan. 26, 2023

(30) Foreign Application Priority Data

Jun. 21, 2021    (IN) .............................. 202121027797

(51) Int. Cl.
G05B 23/02       (2006.01)
G06F 16/23       (2019.01)
G06N 7/01        (2023.01)

(52) U.S. Cl.
CPC ........... *G06N 7/01* (2023.01); *G05B 23/0283* (2013.01); *G06F 16/2365* (2019.01)

(58) Field of Classification Search
CPC .. G06N 7/01; G05B 23/0283; G06F 16/2365; G06F 11/0793; G06F 11/07; G06F 11/3058; G06F 11/30; G06F 11/3072; G06F 11/3476; G06F 11/34; G06F 11/3452
See application file for complete search history.

(56) References Cited

U.S. PATENT DOCUMENTS

| | | | |
|---|---|---|---|
| 2019/0004885 A1 | 1/2019 | Pelletier et al. | |
| 2020/0322703 A1* | 10/2020 | Bures | G06F 16/27 |
| 2023/0332979 A1* | 10/2023 | Satoh | G01M 99/00 |
| 2023/0359194 A1* | 11/2023 | Dickson | G06N 3/08 |

FOREIGN PATENT DOCUMENTS

CN    112306981 A    2/2021

OTHER PUBLICATIONS

Alessio Netti et al. "Online Fault Classification in HPC Systems through Machine Learning," Distributed, Parallel, and Cluster Computing, Jul. 2019, Arxiv, https://arxiv.org/pdf/1810.11208.pdf.

* cited by examiner

*Primary Examiner* — Beau D Spratt
(74) *Attorney, Agent, or Firm* — Finnegan, Henderson, Farabow, Garrett & Dunner, LLP (57) ABSTRACT

State of the art predictive maintenance systems that generate predictions with respect to maintenance of High Performance Computing (HPC) systems have the disadvantage that they either are reactive, or the predictions are affected due to quality issues associated with the data being collected from the HPC systems. The disclosure herein generally relates to predictive maintenance, and, more particularly, to a method and system for predictive maintenance of High Performance Computing (HPC) systems. The system performs abstraction and cleansing on performance data collected from the HPC systems, and generates a cleansed performance data, on which a Machine Leaning (ML) prediction is applied to generate predictions with respect to maintenance of the HPC systems.

9 Claims, 6 Drawing Sheets

METHOD AND SYSTEM FOR PREDICTIVE MAINTENANCE OF HIGH PERFORMANCE SYSTEMS (HPC)

PRIORITY CLAIM

This U.S. patent application claims priority under 35 U.S.C. § 119 to: India Application No. 202121027797, filed on Jun. 21, 2021. The entire contents of the aforementioned application are incorporated herein by reference.

TECHNICAL FIELD

The disclosure herein generally relates to predictive maintenance, and, more particularly, to a method and system for predictive maintenance of High Performance Computing (HPC) systems.

BACKGROUND

High Performance Computing (HPC) systems are being used in a variety of applications that are process intensive and demand faster response. Such HPCs have high-end configuration, and processing load being handled by such systems is quite high. For the same reasons, it is important to monitor such systems to ensure optimal functioning, There are various factors that affect health of such HPCs. For example, as the HPCs handle process intensive operations, temperature at various nodes of the HPC increases. Necessary cooling systems may be provided to control the temperature, however, in case the cooling systems encounter any mechanical failure, the temperature at the HPC may exceed a threshold, which may result in one or more components of the HPC failing.

Predictive maintenance systems address this problem, by monitoring the HPCs for any performance related issues. However, some of the state of the art predictive maintenance systems have the disadvantage that they take a reactive approach in the sense only when a component failure alert is received the maintenance is triggered. This results in increased equipment downtime and in turn loss of productivity. There exist some systems which use a proactive approach, by monitoring and automatically identifying scenarios demanding maintenance of the HPC. Such systems rely on data being collected from various components of the HPC to identify faults, if any. However, disadvantage of such systems is that when the quality of data being received from the HPC systems is not good, accuracy with which the systems can interpret the data and perform predictive maintenance is also less. From example, the collected data may be corrupted due to the presence of noise data. Due to the presence of the noise data, the system may not be able to identify and extract information on various parameters being monitored, so as to identify the faults and in turn determine maintenance requirement of the HPC.

SUMMARY

Embodiments of the present disclosure present technological improvements as solutions to one or more of the above-mentioned technical problems recognized by the inventors in conventional systems. For example, in one embodiment, a processor-implemented method of predictive maintenance of a High-Performance Computing (HPC) system is provided. In this method, a plurality of nodes of the HPC system are monitored via one or more hardware processors. Performance data is collected from each of the plurality of nodes, via the one or more hardware processors. Further, an abstraction and cleansing of the collected performance data is performed. The abstraction and cleansing involves the following steps. The collected performance data from each of the plurality of nodes is sampled to generate a plurality of data samples. Further, outliers are removed from the plurality of data samples, to generate pre-processed data. The pre-processed data is then expanded by applying a time-series up-sampling process. Further, a probability distribution function is calculated based on one or more statistical properties of the collected performance data after applying the up-sampling process. Further, random samples of pre-defined length are generated based on the calculated probability distribution. Further, divergence between the collected performance data and a corresponding original data is measured by processing the generated random samples. The measured divergence is then compared with the threshold of divergence, and an additional generated data is added to the collected performance data to reduce the measured divergence, if the measured divergence exceeds the threshold of divergence. The steps of measuring the divergence and adding the additional generated data are repeated till the measured divergence is below the threshold of divergence. The collected performance data is converted to a time-series data, after reducing the measured divergence below the threshold of divergence. Further, a trend information is associated with the time-series data. Further, a data padding is performed to generate padded time series data, which is then smoothened by applying a mean aggregating timeseries downsampling, to generate a cleansed performance data. The cleansed performance data generated by the abstraction and cleansing is then used to generate one or more predictions with respect to maintenance of at least one of the plurality of nodes of the HPC, by applying a machine learning (ML) prediction on the cleansed performance data.

In another aspect, a system for predictive maintenance of a High-Performance Computing (HPC) system is provided. The system includes one or more hardware processors, an I/O interface, a memory storing a plurality of instructions. The plurality of instructions when executed, cause the one or more hardware processors to monitor a plurality of nodes of the HPC system. The system collects performance data from each of the plurality of nodes. The system then performs abstraction and cleansing of the collected performance data. The abstraction and cleansing involves the following steps. The collected performance data from each of the plurality of nodes is sampled to generate a plurality of data samples. Further, outliers are removed from the plurality of data samples, to generate pre-processed data. The pre-processed data is then expanded by applying a time-series upsampling process. Further, a probability distribution function is calculated based on one or more statistical properties of the collected performance data after applying the upsampling process. Further, random samples of pre-defined length are generated based on the calculated probability distribution. Further, divergence between the collected performance data and a corresponding original data is measured by processing the generated random samples. The measured divergence is then compared with the threshold of divergence, and an additional generated data is added to the collected performance data to reduce the measured divergence, if the measured divergence exceeds the threshold of divergence. The steps of measuring the divergence and adding the additional generated data are repeated till the measured divergence is below the threshold of divergence. The collected performance data is converted to a time-series data, after reducing the measured divergence below the threshold of divergence. Further, a trend information is associated with the time-series data. Further, a data padding is performed to generate padded time series data, which is then smoothened by applying a mean aggregating timeseries downsampling, to generate a cleansed performance data. The cleansed performance data generated by the abstraction and cleansing is then used by the system to generate one or more predictions with respect to maintenance of at least one of the plurality of nodes of the HPC, by applying a machine learning (ML) prediction on the cleansed performance data.

In yet another aspect, a non-transitory computer readable medium for predictive maintenance of a High-Performance Computing (HPC) system is provided. The non-transitory computer readable medium includes a plurality of instructions, which when executed, cause the one or more hardware processors to perform the following steps as part of the predictive maintenance of the HPC. Initially, a plurality of nodes of the HPC system are monitored via the one or more hardware processors. Performance data is collected from each of the plurality of nodes, via the one or more hardware processors. Further, an abstraction and cleansing of the collected performance data is performed. The abstraction and cleansing involves the following steps. The collected performance data from each of the plurality of nodes is sampled to generate a plurality of data samples. Further, outliers are removed from the plurality of data samples, to generate pre-processed data. The pre-processed data is then expanded by applying a time-series upsampling process. Further, a probability distribution function is calculated based on one or more statistical properties of the collected performance data after applying the upsampling process. Further, random samples of pre-defined length are generated based on the calculated probability distribution. Further, divergence between the collected performance data and a corresponding original data is measured by processing the generated random samples. The measured divergence is then compared with the threshold of divergence, and an additional generated data is added to the collected performance data to reduce the measured divergence, if the measured divergence exceeds the threshold of divergence. The steps of measuring the divergence and adding the additional generated data are repeated till the measured divergence is below the threshold of divergence. The collected performance data is converted to a time-series data, after reducing the measured divergence below the threshold of divergence. Further, a trend information is associated with the time-series data. Further, a data padding is performed to generate padded time series data, which is then smoothened by applying a mean aggregating timeseries downsampling, to generate a cleansed performance data. The cleansed performance data generated by the abstraction and cleansing is then used to generate one or more predictions with respect to maintenance of at least one of the plurality of nodes of the HPC, by applying a machine learning (ML) prediction on the cleansed performance data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
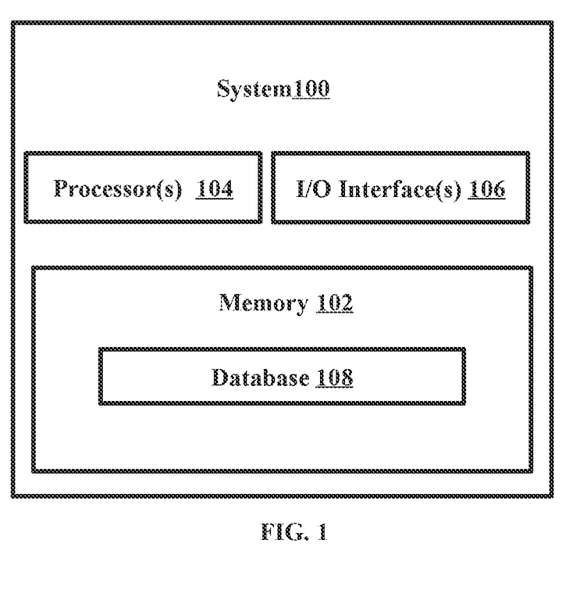
FIG. 1 illustrates an exemplary system for predictive maintenance of High Performance Computing (HPC) systems, according to some embodiments of the present disclosure.

FIG. 1 illustrates an exemplary system for predictive maintenance of High Performance Computing (HPC) systems, according to some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores all data associated with the predictive maintenance being performed by the system 100. For example, information such as but not limited to unique identification of each HPC system being monitored, performance data collected from each HPC system, predictions generated, any intermediate data generated, and so on may be stored in the database 108. Additionally, the database may store a plurality of configurable instructions, which when executed, can cause the one or more hardware processors to perform all steps associated with the predictive maintenance. Functions of the components of the system 100 are explained in conjunction with FIGS. 2 and 3.

Figure 2:
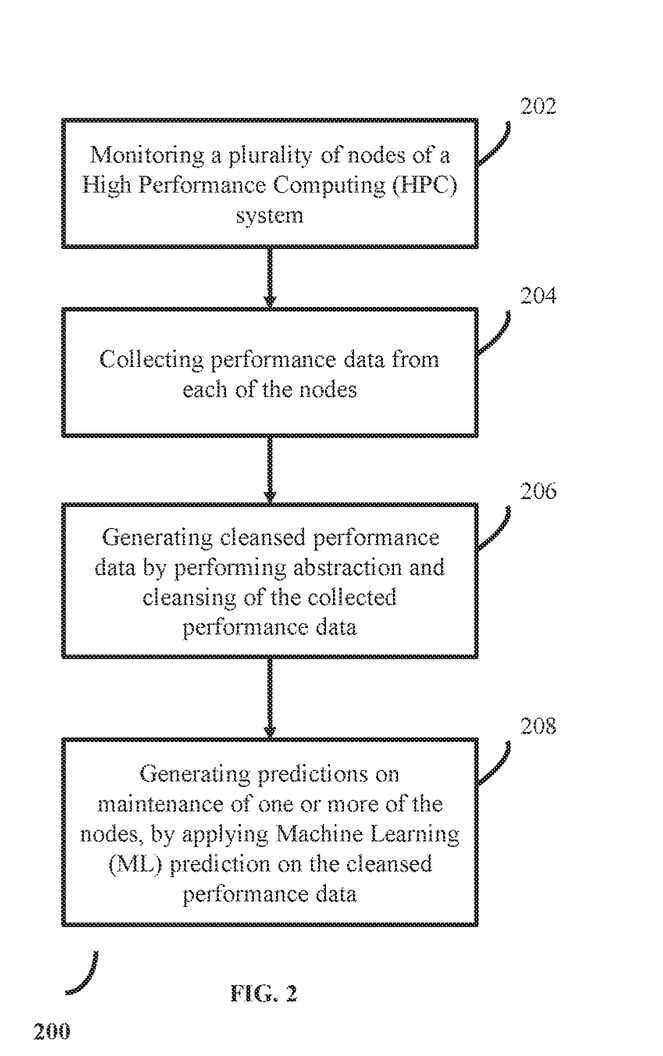
FIG. 2 is a flow diagram depicting steps involved in the process of predictive maintenance by the system of FIG. 1, according to some embodiments of the present disclosure.

FIGS. 2A and 2B (collectively referred to as FIG. 2) is a flow diagram depicting steps involved in the process of predictive maintenance by the system of FIG. 1, according to some embodiments of the present disclosure.

The system 100 may be connected to the HPC for which the predictive maintenance is to be performed, using suitable interface(s) provided by the I/O interface(s) 106. Once connected, at step 202, the system 100 monitors each of a plurality of nodes of the HPC. Monitoring each of the nodes may involve measuring values of a plurality of parameters associated with each of the nodes. For example, the parameters may be, but not limited to, temperature at the node, storage space available, and load on nodes. Appropriate types of sensors, in required quantities, are deployed based on their sensing capability to measure/sense the plurality of parameters. Such parameters may individually or in combination form a performance data at node level or at the HPC level, and is collected as input at step 204.

Figure 3A:
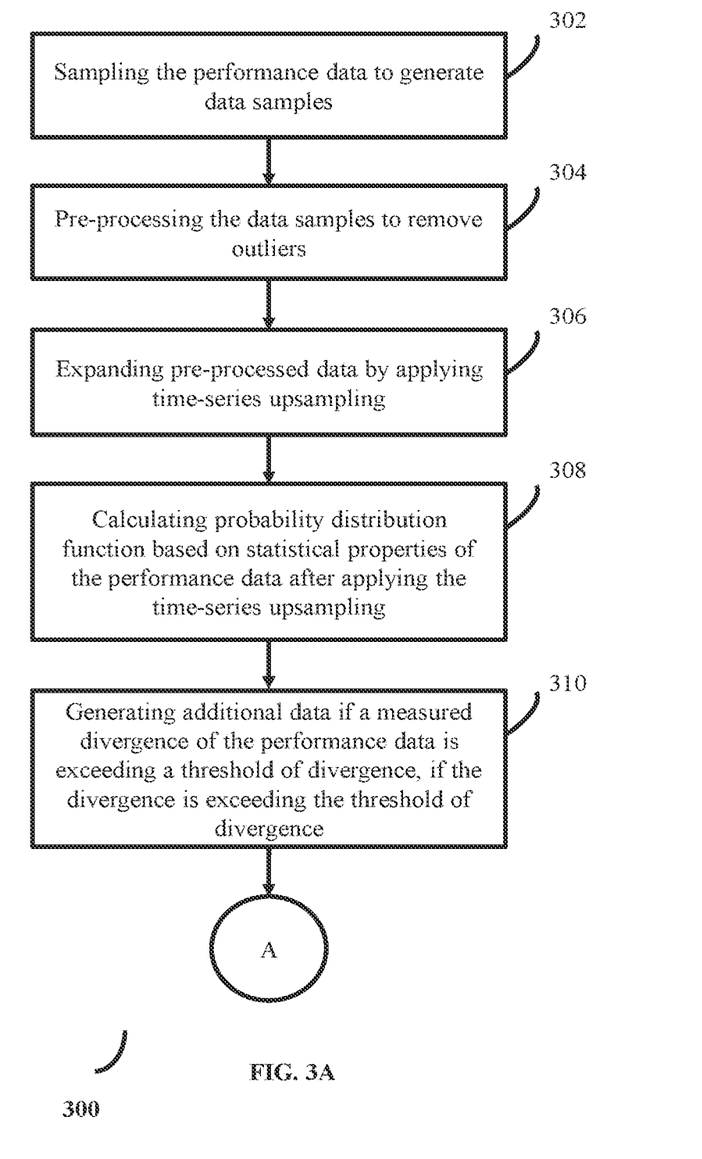
FIGS. 3A and 3B (collectively referred to as FIG. 3) is a flow diagram depicting steps involved in the process of performing abstraction and cleansing on collected performance data, by the system of FIG. 1, in accordance with some embodiments of the present disclosure.
Figure 3B:
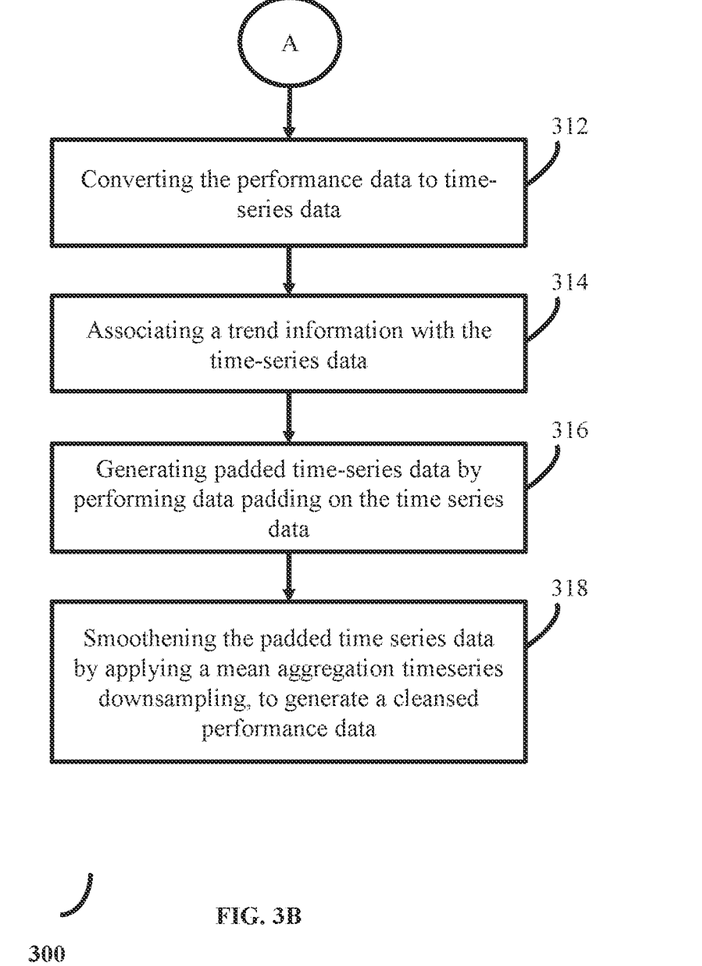

In order to improve quality of the collected performance data, at step 206, the system 100 performs abstraction and cleansing on the collected performance data. Steps involved in the process of abstraction and cleansing are depicted in FIG. 3.

At step 302, the system 100 samples the collected performance data to a plurality of data samples. The system 100 may use any suitable data processing technique to sample the collected performance data. At step 304, the system 100 pre-processes the plurality of data samples to identify and remove outliers present in the data samples. The system 100 may use any suitable technique such as but not limited to z-score method, and IQR score method, to identify and remove the outliers of data.

Further, at step 306, the system 100 expands the pre-processed data by applying time-series up-sampling. At this step, the system 100 spreads distribution of the pre-processed data by applying time-series up-sampling. Further, at step 308, the system 100 calculates a probability distribution function, based on statistical properties of the performance data after applying the time-series upsampling. The statistical properties considered by the system 100 are, but not limited to, min/max/median calculations and frequency. The system 100 may be configured to use any suitable standard deviation function such as but not limited to Normal, Uniform, and Quasi normal distribution. In another embodiment, the system 100 may be configured to consider that the different parameters in the pre-processed data are distributed within a specific range.

Collected performance data may not be same as a corresponding original data, and there be some level of divergence between the collected performance data and the original data. By comparing the collected performance data and the original data, the system 100 determines the divergence. In practical applications, an exact match between the collected performance data and the original data may not be required, and some level of divergence may be allowed/permitted. To control this, a threshold of divergence may be defined such that measured divergence upto the threshold of divergence may be permitted/allowed. However, if the measured divergence is exceeding the threshold of divergence, the system 100 generates additional data which is then added to the collected performance data to reduce the measured divergence. Every time the additional data is added, the divergence reduces. The steps of generating the additional data and adding to the collected performance data are repeated till the measured divergence is below the threshold of divergence. In an embodiment, the divergence may be determined/calculated in terms of any suitable measurements. For example, the divergence is measured in terms of Kullback-Leibler divergence (d_kl).

The collected performance data may be raw data. To improve the quality, at step 312, the system 100 associates time-stamp with the collected performance data, thereby converting the collected performance data to time-series data. At step 314, the system 100 associates trend information with the time series data. The term 'trend information' in the context of the embodiments disclosed herein refers to a trend observed in past instances (historical data) of operation. The trend information acts as an additional reference/pointer to generating the predictions at step 318. For example, the trend information would indicate values of parameters when a node or the entire HPC system failed in the past. If similar trend is detected during the monitoring, then the predictions may be generated accordingly. To further improve quality of the data, the system 100, at step 316, performs data padding, to generate padded time-series data. The system 100 may perform the data padding by means of extrapolation and/or interpolation, so as to fill up empty/unused spaces that may be present in the time-series data. The system 100 may use bits or characters to fill up the empty spaces, thereby improving quality of the data.

Further, at 318, the system 100 smoothens the padded time series data by applying a mean aggregation timeseries downsampling, thereby obtaining a cleansed performance data.

Figure 4A:
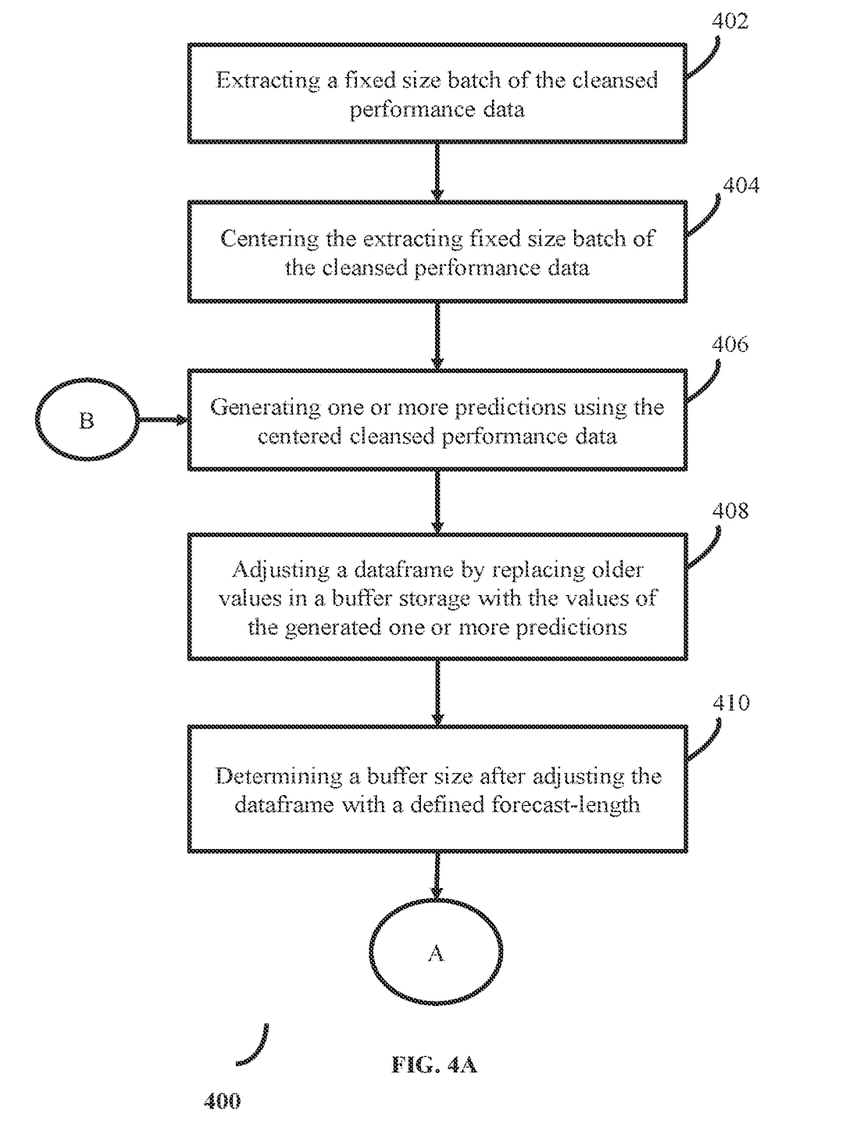
FIGS. 4A and 4B (collectively referred to as FIG. 4) is a flow diagram depicting steps involved in the process of applying Machine Learning (ML) to generate predictions related to the predictive maintenance, by the system of FIG. 1, in accordance with some embodiments of the present disclosure.

The cleansed performance data obtained at step 318 is then used to generate predictions on maintenance of one or more nodes of the HPC system, by applying Machine Learning (ML) prediction on the cleansed performance data. Steps involved in the process of the ML prediction on the cleansed performance data are depicted in FIG. 4. At step 402, the system 100 extracts a data batch of a particular size from the cleansed performance data. The size of the batch (batch size) may be defined as per requirements, preferably by considering factors such as but not limited to hardware specifications, and type of ML technique/algorithm used. For example, the batch size is 30 minutes. So, if the cleansed performance data contains information on temperature measured from the nodes of the HPC system, and if the batch size set is 30 minutes, each batch will have temperature data collected for 30 minutes at a stretch. Further, at step 404, the system 100 centers the data in each of the batches of data. At this stage, the system 100 may apply a MinMax scaling on dataframe and derive additional columns.

Figure 4B:
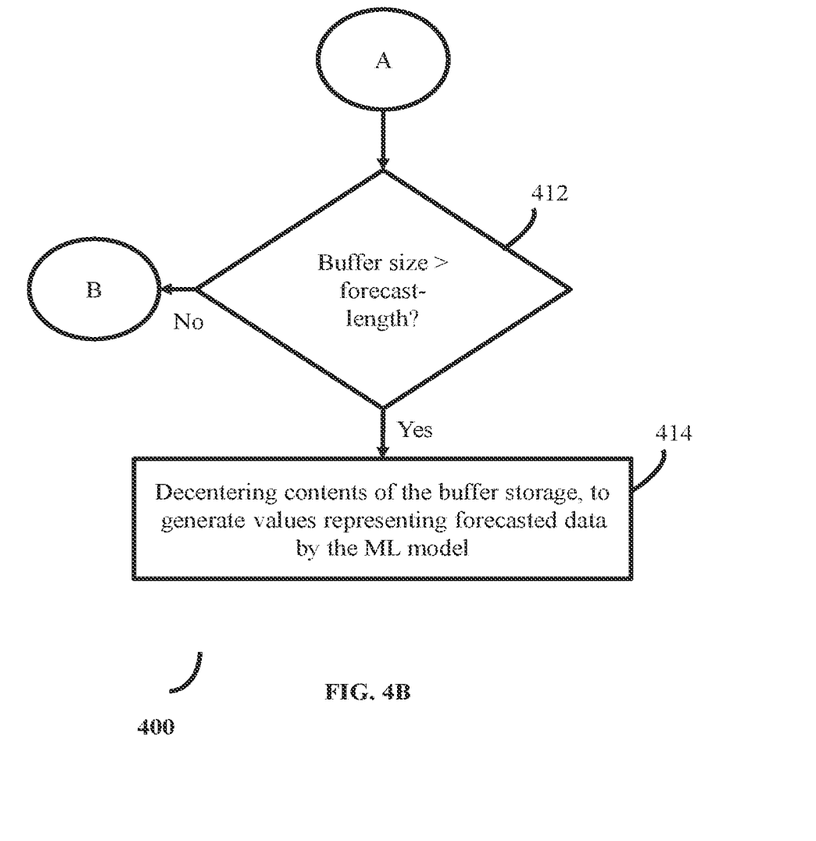

At step 406, the system 100 generates a plurality of predictions by processing the data in the data-frame. The predictions generated for each dataframe are added to a buffer storage. At step 408, the system 100 adjusts the dataframe by replacing older datapoints in the dataframe with the predictions generated at step 406. After adjusting the dataframe, the system 100 determines size of the buffer (i.e. buffer size). At step 412, the system 100 compares the determined buffer size with a forecast-length. The system 100 iterates the steps 406 through 412, till the buffer size exceeds the forecast-length. When the buffer size exceeds the forecast-length, the system 100 decenters/reverse-transforms contents of the buffer storage, generating values that represent forecasted data by the ML model. The forecasted data maybe then provided as output, using appropriate interfaces to a user, to prompt the user to take appropriate corrective measures. In another embodiment, the system 100 maintains in the database 108, historical information with respect to issues identified and corresponding actions triggered, in past predictive maintenance sessions. The system 100 may identify one or more corrective actions based on the historical information, and may automatically trigger the identified actions. Some examples of the corrective action are, but not limited to, replacing faulty component, and reducing load on the components. For example, processors/nodes that handle intense data processing may heat up. Upon identifying that temperature at a particular node of the HPC is increasing beyond a threshold, the system 100 may generate recommendation to reduce overload on the node, so that the temperature can be brought down.

In an embodiment, the ML prediction model used by the system 100 is a Long-Short Term Memory (LSTM) based model, which uses a many to one and one to many topology. When the many to one and one to many topology are used, the system 100 takes a sequence of data as input and initially generates a single output. Further, the single output is given as input to the ML model, to generate a sequence of outputs. In an example implementation, the system 100 generates a future time series values (N values from t=0 to t=N). Later when actual measured value for t=0 is available, the system 100 updates prediction for t=1 to t=N, and also generates prediction for t=N+1, based on the actual measured value for t=0.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of predictive maintenance of HPC systems. The embodiment thus provides a mechanism of abstraction and cleansing of data collected from nodes of the HPC system being monitored. Moreover, the embodiments herein further provide a mechanism to generate predictions by applying a Machine Learning model on cleansed performance data obtained by applying the abstraction and cleansing on collected performance data.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for predictive maintenance of a High-Performance Computing (HPC) system, comprising:
   monitoring a plurality of nodes of the HPC system, via one or more hardware processors;
   collecting performance data from each of the plurality of nodes, via the one or more hardware processors;
   performing abstraction and cleansing of the collected performance data, the abstraction and cleansing comprising:
      sampling the collected performance data from each of the plurality of nodes, to generate a plurality of data samples;
      removing outliers from the plurality of data samples, to generate pre-processed data;
      expanding the pre-processed data by applying a time-series up-sampling process;
      calculating a probability distribution function based on one or more statistical properties of the collected performance data after applying the time-series up-sampling process;
      iteratively performing till a measured divergence of the collected performance data is below a threshold of divergence:
         generating random samples of pre-defined length based on the calculated probability distribution;
         measuring the divergence between the collected performance data and a corresponding original data, by processing the generated random samples;
         comparing the measured divergence with the threshold of divergence; and
         adding an additional generated data to the collected performance data to reduce the measured divergence, if the measured divergence exceeds the threshold of divergence;
      converting the collected performance data to a time-series data, after reducing the measured divergence below the threshold of divergence;
      associating a trend information with the time-series data;
      performing data padding to generate padded time series data, wherein the data padding comprises filling up empty spaces present in the time series data; and
      smoothening the padded time-series data by applying a mean aggregating timeseries downsampling, to generate a cleansed performance data; and
   generating one or more predictions with respect to maintenance of at least one of the plurality of nodes of the HPC, by applying a machine learning (ML) prediction on the cleansed performance data.

2. The method as claimed in claim 1, wherein the divergence is measured as Kullback-Leibler divergence value ($d\_kl$).

3. The method as claimed in claim 1, wherein applying the ML prediction comprises:
   extracting a fixed size batch of the cleansed performance data;
   centering the extracted fixed size batch of the cleansed performance data;
   iteratively performing till a buffer size of a data buffer exceeds a defined forecast-length:
      generating one or more predictions using centered cleansed performance data;
      adjusting a dataframe by replacing older values in a buffer storage with values of the generated one or more predictions; and
      comparing the buffer size determined after adjusting the dataframe, with the defined forecast-length; and
   decentering contents of the buffer storage, wherein decentering the contents comprises reverse transforming the contents of the buffer storage to generate a plurality of values representing forecasted data by a Machine Learning (ML) model used to apply the ML prediction.

4. A system for predictive maintenance of a High-Performance Computing (HPC) system, comprising:
   one or more hardware processors;
   an I/O interface; and
   a memory storing a plurality of instructions, wherein the plurality of instructions when executed, cause the one or more hardware processors to:
      monitor a plurality of nodes of the HPC system;
      collect performance data from each of the plurality of nodes;
      perform abstraction and cleansing of the collected performance data, the abstraction and cleansing comprising:
         sampling the collected performance data from each of the plurality of nodes, to generate a plurality of data samples;
         removing outliers from the plurality of data samples, to generate pre-processed data;
         expanding the pre-processed data by applying a time-series upsampling process;
         calculating a probability distribution function based on one or more statistical properties of the collected performance data after applying the time-series upsampling process;
         iteratively performing till a measured divergence of the collected performance data is below a threshold of divergence:
            generating random samples of pre-defined length based on the calculated probability distribution;
            measuring the divergence between the collected performance data and a corresponding original data, by processing the generated random samples;
            comparing the measured divergence with the threshold of divergence; and
            adding an additional generated data to the collected performance data to reduce the measured divergence, if the measured divergence exceeds the threshold of divergence;
         converting the collected performance data to a time-series data, after reducing the measured divergence below the threshold of divergence;
         associating a trend information with the time-series data;
         performing data padding to generate padded time series data, wherein the data padding comprises filling up empty spaces present in the time series data; and smoothening the padded time-series data by applying a mean aggregating timeseries downsampling, to generate a cleansed performance data; and generate one or more predictions with respect to maintenance of at least one of the plurality of nodes of the HPC, by applying a machine learning (ML) prediction on the cleansed performance data.

5. The system as claimed in claim 4, wherein the system measures the divergence as Kullback-Leibler divergence value (d_kl).

6. The system as claimed in claim 4, wherein the system applies the ML prediction by:

extracting a fixed size batch of the cleansed performance data;

centering the extracted fixed size batch of the cleansed performance data;

iteratively performing till a buffer size of a data buffer exceeds a defined forecast-length:

generating one or more predictions using centered cleansed performance data;

adjusting a dataframe by replacing older values in a buffer storage with values of the generated one or more predictions; and comparing the buffer size determined after adjusting the dataframe, with the defined forecast-length; and decentering contents of the buffer storage, wherein decentering the contents comprises reverse transforming the contents of the buffer storage to generate a plurality of values representing forecasted data by a Machine Learning (ML) model used to apply the ML prediction.

7. A non-transitory computer readable medium for predictive maintenance of a High-Performance Computing (HPC) system, wherein the non-transitory computer readable medium comprising a plurality of instructions, which when executed, cause:

monitoring a plurality of nodes of the HPC system, via one or more hardware processors;

collecting performance data from each of the plurality of nodes, via the one or more hardware processors;

performing abstraction and cleansing of the collected performance data, the abstraction and cleansing comprising:

sampling the collected performance data from each of the plurality of nodes, to generate a plurality of data samples;

removing outliers from the plurality of data samples, to generate pre-processed data;

expanding the pre-processed data by applying a time-series up-sampling process;

calculating a probability distribution function based on one or more statistical properties of the collected performance data after applying the time-series up-sampling process;

iteratively performing till a measured divergence of the collected performance data is below a threshold of divergence:

generating random samples of pre-defined length based on the calculated probability distribution;

measuring the divergence between the collected performance data and a corresponding original data, by processing the generated random samples;

comparing the measured divergence with the threshold of divergence; and adding an additional generated data to the collected performance data to reduce the measured divergence, if the measured divergence exceeds the threshold of divergence;

converting the collected performance data to a time-series data, after reducing the measured divergence below the threshold of divergence;

associating a trend information with the time-series data;

performing data padding to generate padded time series data, wherein the data padding comprises filling up empty spaces present in the time series data; and smoothening the padded time-series data by applying a mean aggregating timeseries downsampling, to generate a cleansed performance data; and generating one or more predictions with respect to maintenance of at least one of the plurality of nodes of the HPC, by applying a machine learning (ML) prediction on the cleansed performance data.

8. The non-transitory computer readable medium as claimed in claim 7, wherein the divergence is measured as Kullback-Leibler divergence value (d_kl).

9. The non-transitory computer readable medium as claimed in claim 7, wherein the non-transitory computer readable medium applies the ML prediction by:

extracting a fixed size batch of the cleansed performance data;

centering the extracted fixed size batch of the cleansed performance data;

iteratively performing till a buffer size of a data buffer exceeds a defined forecast-length:

generating one or more predictions using centered cleansed performance data;

adjusting a dataframe by replacing older values in a buffer storage with values of the generated one or more predictions; and comparing the buffer size determined after adjusting the dataframe, with the defined forecast-length; and decentering contents of the buffer storage, wherein decentering the contents comprises reverse transforming the contents of the buffer storage to generate a plurality of values representing forecasted data by a Machine Learning (ML) model used to apply the ML prediction.

* * * * *